(12) United States Patent
Takahashi et al.

(10) Patent No.: US 7,053,946 B2
(45) Date of Patent: May 30, 2006

(54) VIDEO CAMERA IMAGER AND IMAGER IC CAPABLE OF PLURAL KINDS OF DOUBLE-IMAGE PROCESSINGS

(75) Inventors: Yuichiro Takahashi, Sagamihara (JP); Makoto Sube, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 870 days.

(21) Appl. No.: 10/091,406

(22) Filed: Mar. 7, 2002

(65) Prior Publication Data
US 2004/0201763 A1    Oct. 14, 2004

(30) Foreign Application Priority Data
Mar. 27, 2001   (JP)   ............................. 2001-090499

(51) Int. Cl.
H04N 3/14 (2006.01)
H04N 5/335 (2006.01)

(52) U.S. Cl. ...................... 348/294; 382/312; 358/513; 358/514

(58) Field of Classification Search .................... None
See application file for complete search history.

(56) References Cited

U.S. PATENT DOCUMENTS

| 4,602,273 | A |   | 7/1986 | Carlson |  |
|---|---|---|---|---|---|
| 5,272,535 | A | * | 12/1993 | Elabd | 348/314 |
| 5,396,290 | A | * | 3/1995 | Kannegundla et al. | 348/312 |
| 6,356,306 | B1 | * | 3/2002 | Kobayashi | 348/322 |
| 6,587,149 | B1 | * | 7/2003 | Yoneyama et al. | 348/362 |
| 6,798,448 | B1 | * | 9/2004 | Motono et al. | 348/222.1 |
| 2002/0033887 | A1 | * | 3/2002 | Hieda et al. | 348/220 |
| 2004/0105016 | A1 | * | 6/2004 | Sasaki | 348/222.1 |
| 2004/0263645 | A1 | * | 12/2004 | Okada et al. | 348/231.99 |

FOREIGN PATENT DOCUMENTS

| JP | 7-322147 | 12/1995 |
|---|---|---|
| JP | 11-075109 | 3/1999 |
| JP | 11-155098 | 6/1999 |
| JP | 2000-228745 | 8/2000 |
| JP | 3-156503 | 2/2001 |
| WO | WO 94/18801 | 8/1994 |

OTHER PUBLICATIONS

Bryan Ackland and Alex Dickinson (1996 IEE International Solid State Circuits Conference 0-7808-3136-2/96).*

* cited by examiner

Primary Examiner—David Ometz
Assistant Examiner—Hung H. Lam
(74) Attorney, Agent, or Firm—McDermott Will & Emery LLP

(57) ABSTRACT

An inventive video camera imager supports an interlace scan mode, a dynamic range-widening scan (WS) mode and a sequential scan mode with a limited amount of circuitry. For this, a WS image signal of 2N lines and a sequential scan image signal of 2N lines (N is the number of scan lines of an image to be obtained) is used. Every other line of WS image signal is longer in exposure time than adjacent lines of the WS image signal. A simplified imager may support only interlace scan mode and sequential scan mode, or may support only WS mode and sequential scan mode.

18 Claims, 6 Drawing Sheets

FIG. 2
INTERLACE SCAN (IS) MODE
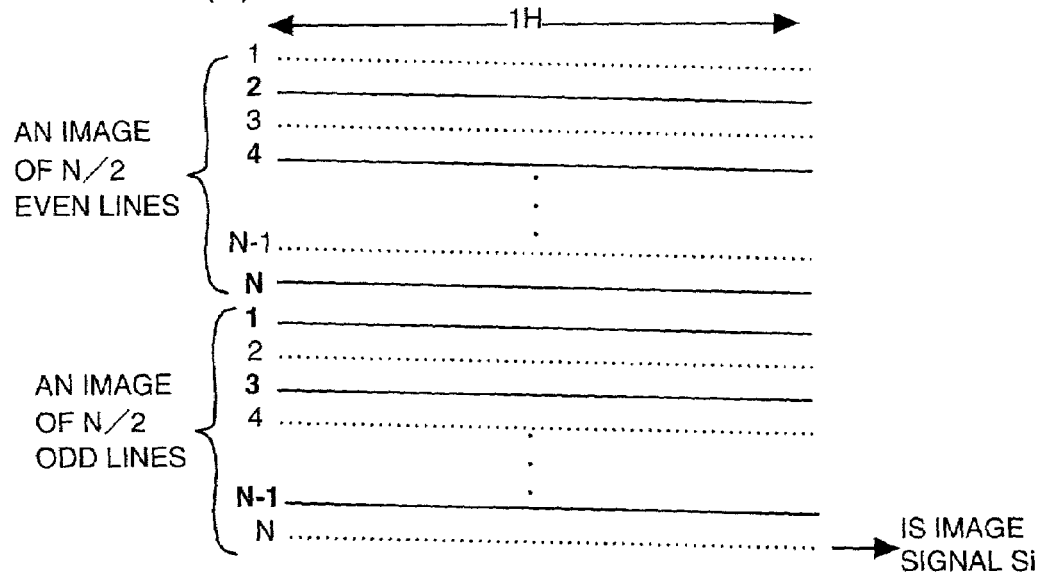
DYNAMIC RANGE WIDENING SCAN (WS) MODE
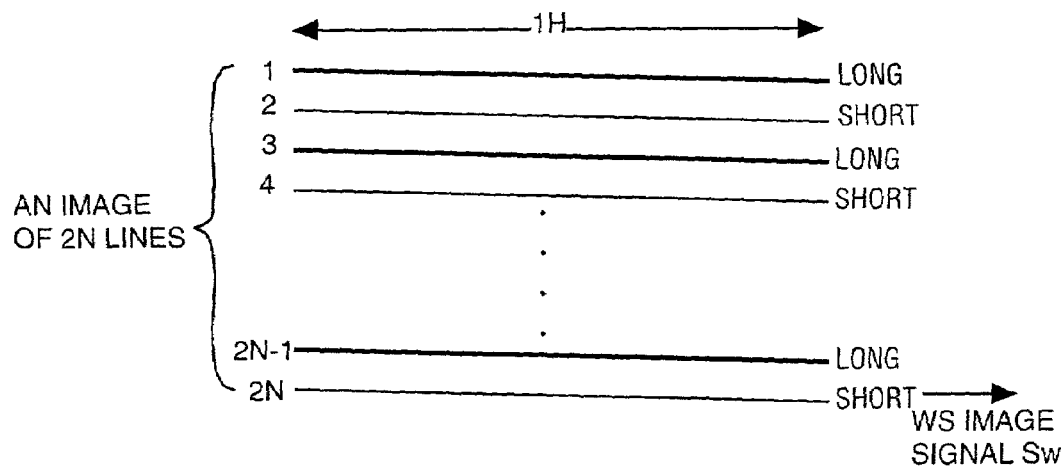
SEQUENTIAL SCAN (SS) MODE
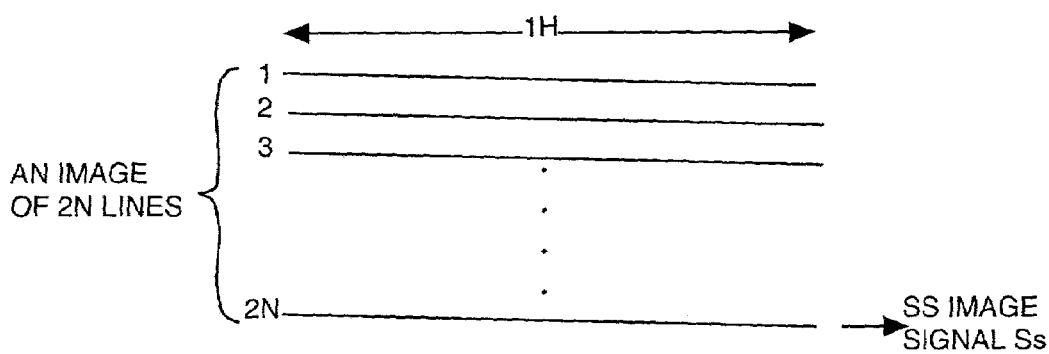

FIG. 3

| OPERATION MODE | SELECTORS | | SIGNAL MIXER 42 | SELECTORS | | OUTPUT FROM ELEMENT 60 / OUTPUT FROM ELEMENT 70 |
|---|---|---|---|---|---|---|
| | 32 | 36 | | 44 | 74 | |
| INTERLACE SCAN MODE | X | A | X (GRADATION CORRECTION) | A (B) | B | X / IS IMAGE SIGNAL |
| DYNAMIC RANGE-WIDENING SCAN MODE | A | B | MIXING + GRADATION CORRECTION | B | B | X / DR-WIDENED IMAGE SIGNAL |
| SEQUENTIAL SCAN MODE | B | A | GRADATION CORRECTION | A | A | SEQUENTIAL SCAN IMAGE SIGNAL / INTERLACE SCAN IMAGE SIGNAL |

VIDEO CAMERA IMAGER AND IMAGER IC CAPABLE OF PLURAL KINDS OF DOUBLE-IMAGE PROCESSINGS

BACKGROUND OF THE INVENTION

1. Field of the Invention

The invention generally relates to an imaging method and apparatus for use in a video camera and more specifically to an imager that can operates in one of at least two double-image processing modes.

2. Description of the Prior Art

Conventional television systems such as the NTSC (National Television System Committee) system are using the interlace scanning. However, the sequential scanning has come to be used for a higher resolution. Also, in order to widen the dynamic range of an imaging apparatus, some of the imagers adopt a dynamic range-widening scan scheme by using a CCD device having twice the number of pixels in the vertical direction.

Since ICs (integrated circuits) are increasing in the scale, developing an imager IC (integrated circuit) dedicated to one of above-mentioned applications in response to a specific demand would result in a late release of a desired article.

However, if an imager were simply arranged to meet each of the above applications, the circuit scale of the imager would become too large.

Accordingly, it is an object of the invention to provide an imaging method and apparatus that efficiently support the interlace scan mode, the dynamic range-widening scan mode and the sequential scan mode with a limited mount of circuitry.

It is another object of the invention to provide an imager IC that efficiently supports the interlace scan mode, the dynamic range-widening scan mode and the sequential scan mode with a limited mount of circuitry.

SUMMARY OF THE INVENTION

According to the invention, an imager, for use in a video camera, which can operate in any of an interlace scan mode, a dynamic range-widening scan (WS) mode and a sequential scan mode. The imager comprises a CCD portion, responsive to a mode selection signal, for generating a corresponding one of an interlace scan image signal, a WS image signal of 2N lines and a sequential scan image signal of 2N lines (N is the number of scan lines of an image to be obtained). Every other line of WS image signal is longer in exposure time than adjacent lines of the WS image signal. Each pair of odd lines and even lines of the WS image signal and the sequential scan image signal is synchronized by two 1H-memories. In the WS mode, a synchronized pair of odd and even lines of the WS image signal is added together by a mixer to become a dynamic range-widened image signal. The interlace scan image signal, the dynamic range-widened image signal and a pair of odd line signal and even line signal of the sequential scan image signal are subjected to the image signal regulation by a image signal regulator.

In the interlace scan mode, the regulated interlace scan image signal is output through a first input of an alternative selector. In the WS mode, the regulated dynamic range-widened image signal is output through the first input of the alternative selector. In the sequential scan mode, the regulated odd line signal and even line signal of the sequential scan image signal are combined by a sequential scan image signal generator into a new sequential scan image signal for output. Also, in the sequential scan mode, the odd line signal and the even line signal of the sequential scan image signal are added together by an adder to become a new image signal equivalent to the interlace scan image signal, which new image signal is output through the second input of the alternative selector.

In one embodiment, a simplified imager supports only the interlace scan mode and the sequential scan mode.

In another embodiment, a simplified imager supports only the WS mode and the sequential scan mode.

In the IS and WS modes, the image signal regulator calculates a vertical contour correction value for the current line from 5 lines centered on the current line. In the SS mode, the image signal regulator calculates a vertical contour correction value for each of the current odd line and even line from 6 lines centered on two current odd and even lines.

BRIEF DESCRIPTION OF THE DRAWING

Further objects and advantages of the present invention will be apparent from the following description of the preferred embodiments of the invention as illustrated in the accompanying drawing, in which:

FIG. 2 is a diagram showing output image signals a CCD portion 14 of FIG. 1 provides in IS, WS and SS operations;

FIG. 3 is a table useful in understanding the operation of the imager 1 of FIG. 1;

Throughout the drawing, the same elements when shown in more than one figure are designated by the same reference numerals.

DETAILED DESCRIPTION OF THE PREFERRED EMBODIMENTS

Figure 1:
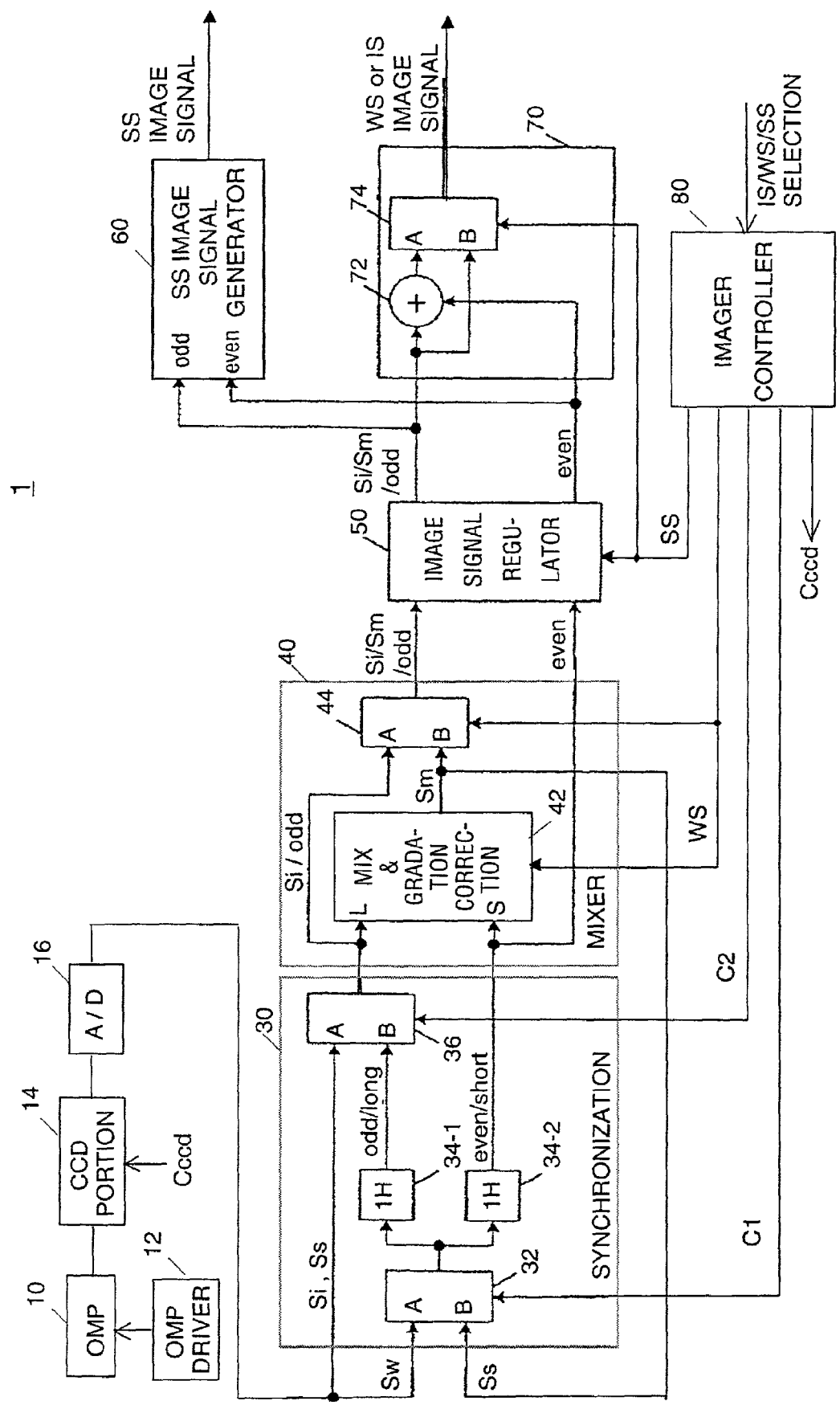
FIG. 1 is a block diagram showing an exemplary arrangement of an imager that effectively supports interlace scan (IS) operation, dynamic range widening scan (WS) operation and sequential scan (SS) operation in accordance with an illustrative embodiment of the invention.

FIG. 1 is a schematic functional block diagram showing an exemplary arrangement of an imager 1 that effectively supports interlace scan (IS) operation, dynamic range widening scan (WS) operation and sequential scan (SS) operation in accordance with an illustrative embodiment of the invention. In FIG. 1, the imager 1 comprises an optical and mechanical portion (OMP) 10 for focusing into an image of the object to be shot; an OMP driver 12 for driving the optical and mechanical portion 10 in responsive to control signals supplied from the external; a CCD (charge coupled device) portion 14 that operates in one of three (i.e., IS, WS and SS) operation modes in response to a IS/WS/SS selection signal supplied from the outside of the imager 1 (i.e., from a not-shown controller for controlling the entire video camera in which the imager 1 is used); a preprocessor (not shown) for effecting analog processing (e.g., AGC (automatic gain control)) of the image signal from the CCD portion 14; an analog-to-digital converter (A/C) 16 for converting the analog image signal from the preprocessor 16 into a digital image signal; a synchronizer 30 for providing a time axis conversion in the dynamic range widening scan (WS) operation or in the sequential scan operation; a signal mixer 40 for mixing two image signals of different exposure (or charging) times into a dynamic range-widened image signal in the WS operation mode; an image signal regulator 50 for providing basic camera signal processing such as contour correction; a sequentially scanned image signal generator 60 for composing a single sequential scan image signal from an odd line field signal and an even line field signal into which a sequential scan image signal has been separated by the time axis conversion 30 in the SS mode; an IS and WS signal output portion 70 for outputting an IS or WS image signal depending on the operation mode; and an imager controller 80 for supplying various control signals to respective elements as detailed later.

Specifically, the synchronizer 30 comprises a first alternative selector 32 having one data input 32A connected to the A/D 16 output and its control input terminal connected to an output C1 terminal of the imager controller 80; two 1-line memories (1H) 34 which each store a horizontal line's worth of pixel data and which have their input ports connected together to the selector 32 common terminal; and a second alternative selector 36 having one data input 36A connected to the A/D 16 output (and accordingly to the selector 32 input 32A), the other data input 36B connected to a first one (e.g., 34-1) of two 1H-memories 34 and its control input terminal connected to an output C2 terminal of the imager controller 80.

The signal mixer 40 comprises a mix and gradation correction 42 having its one data input 42L connected to the selector 36 common terminal, its other data input 42S connected to a second one (34-2 in this specific example) of two 1H-memories 34 and its control input connected to a control output WS of the imager controller 80; and a third alternative selector 44 having one data input 44A connected to the selector 36 common terminal and the mixer input 42L, the other data input 44B connected to the mixer 42 output and a selector 32 input 32B and its control input terminal connected to the control output WS of the imager controller 80. The control signal WS takes a binary value depending on whether the operation mode of the imager 1 (or the CCD portion 14) is in the dynamic range widening scan (WS) mode or not. It is assumed that the signal WS is logical "1" in case of the WS mode. Then, the mixer 42 is so arranged as to add the L input signal, which has been longer exposed or charged, and the S input signal, which has been shorter exposed or charged, yielding a dynamic range-widened image signal and to effect an gradation correction on the dynamic range-widened image signal if the imager 1 is in the WS mode. Though the common terminal of the alternative selector 36 is supplied to the A input of selector 44 in the interlace scan (IS) mode and the sequential scan (SS) mode, the selector 36 common terminal may be gradation corrected in the mixer 42 and then supplied to the B input of the selector 44 in the IS and SS modes.

The image signal regulator 50 has one data input connected a common terminal of the alternative selector 44, the other data input connected to the second IH memory 34-2 and the mixer input 42S, and its control input connected to a control output SS of the imager controller 80. The image signal regulator 50 is detailed later.

The IS and WS (or Sm) signal output portion 70 comprises an adder 72 that is utilized in the SS mode for adding the first and second outputs of the image signal regulator 50, which are an odd line signal and an even line signal in the mode, to generate an interlace scanned image signal; and a fourth alternative selector 74. The image signal regulator 50 first output is connected to an (odd) input of the SS image signal generator 60, the adder 72 first input and a first input of the adder 72 and a selector input 74B. The image signal regulator 50 second output is connected to an (even) input of the SS image signal generator 60 and the adder 72 second input. The selector 74 has its control input connected to the SS control output of the imager controller 80. The SS control signal takes a binary value depending on whether the imager 1 or the CCD portion 14 is in the SS mode or not. The selector 74 and the controller 80 (or the control signal SS) is so configured as to output the selector 74A input signal in the SS mode and to output the selector 74B input signal in other scan or operation mode.

FIG. 2 is a diagram showing output image signals a CCD portion 14 of FIG. 1 provides in response to a Cccd control signal from the controller 80. The Cccd control signal takes three values corresponding to the IS, WS and SS operation modes. As shown in FIG. 2, the CCD portion 14 outputs an IS image signal Si in the IS mode: i.e., outputs an image or field signal of N/2 odd lines and an image signal of N/2 even lines successively every $\frac{1}{30}$ seconds. The number N is the number of horizontal scanning lines of an image to be obtained. In the dynamic range widening scan (WS) mode, the CCD portion 14 outputs an image of 2N lines every second one of which differs in the exposure (or charging) time from the adjacent lines every $\frac{1}{30}$ seconds. And, in the sequential scan (SS) mode, the CCD portion 14 outputs an image of 2N horizontal scan lines every $\frac{1}{30}$ seconds.

FIG. 3 is a table useful in understanding the operation of the imager 1 of FIG. 1. In the table, a symbol "X" indicates that a corresponding element is not used or disabled in the mode. Symbols "A" and "B" in the selector columns indicate that the selector outputs the signal applied to the input terminal labeled with the specified symbol.

Referring to FIGS. 1 through 3, the operation of the imager 1 is described in the following.

Interlace Scan Mode

If a mode specifying command or signal (IS/WS/SS selection signal) from the not-shown controller of the camera in which the imager 1 is used indicates the IS mode, then the above-mentioned IS image signal Si is output from the A/D 16. In this case, the control signal C1 disables the selector 32 and control signal C2 causes the selector 36 to select the A input signal or output the signal Si, which is basically applied to the selector 44 input A. Since the input 44A is selected, the signal Si is input to the linked input of image signal regulator 50 to be subjected to a contour correction and appears at the corresponding regulator 50 output. Since the B input is coupled to the common terminal in the selector 74, the contour-corrected IS image signal Si is output from the selector 74 common terminal.

In the above example, the signal Si is passed, as it is, to the image signal adjustor 50 by controlling the selector 44 to select its A input. However, the mixer 42 and the selector 44 may be arranged such that the mixer 42 executes only a gradation correction and the selector 44 selects its B input.

Dynamic Range-Widening Scan Mode

If the mode specifying command or IS/WS/SS selection signal indicates the IS mode, then the above-mentioned WS image signal Sw is output from the A/D 16. Since the selector 32 selects its A input as shown in FIG. 3, the selector 32 outputs the signal Sw. Each of the long exposed lines ($\{H(2n-1)|n=1, 2, \ldots, N\}$ in the specific example of FIG.

2) is stored in the 1H-memory 34-1, while each of the shortly exposed lines ({H(2n)|n=1, 2, . . . , N} in the specific example of FIG. 2) is stored in the 1H-memory 34-2. The long exposed line data H(2n−1) and the shortly exposed line data H(2n) stored in the 1H-memories 34 are simultaneously read out and supplied to the mixer 42 respective inputs L and S through the selector 36 input B and common terminal. The mixer 42 calculates the sums of corresponding pixels of the long H(2n−1) and shortly H(2n) exposed lines which sums constitute a dynamic range-widened image signal Sm and gradation corrects the image signal Sm, which is supplied to the image signal regulator 50 through the selector 44 input B and common terminal. The regulated image signal Sm is output through the selector 74 input B and common terminal.

Sequential Scan Mode

If the mode specifying command or IS/WS/SS selection signal indicates the SS mode, then the above-mentioned SS image signal Ss is output from the A/D 16. Since the selector 32 selects its B input and the selector 36 selects its A input as shown in FIG. 3, the signal Ss is supplied to the mixer 42 input L through selector 36 input A. In this case, the mixer 42 is so arranged as to effect only a gradation correction on the L input signal or signal Ss. Since the selector 44 is selecting its A input and the selector 32 is selecting B, the gradation-corrected signal Ss appears at the selector 32 common terminal. Each odd line and each even line of the signal Ss are stored in the 1H-memories 34-1 and 34-2, respectively. The odd line data H(2n−1) and the even line data H(2n) stored in the 1H-memories 34 are simultaneously read out and supplied to the image signal regulator 50 through the selector 44 input A and common terminal. This is because the mixer 42 is so arranged as to become in active just after the gradation correction of signal Ss. The odd and even line signals are regulated by the image signal regulator 50.

The regulated odd and even line signals are combined into a sequentially scanned image signal in the SS image generator 60 and output as the SS image signal. Also, the regulated odd and even line signals are added together by the adder 72 to become an image signal equivalent to the interlace scanned image signal. Thus obtained interlace scan image signal is output through the selector 74 input A and common terminal. Thus, if the CCD portion 14 or the imager 1 is operated in the SS mode, the imager 1 can provide not only an SS image signal from the SS image generator 60 but also an IS image signal from the selector 74 common terminal.

As described above, the inventive imager 1 can effectively support the interlace scan operation, the dynamic range widening scan operation and the sequential scan operation.

Figure 4:
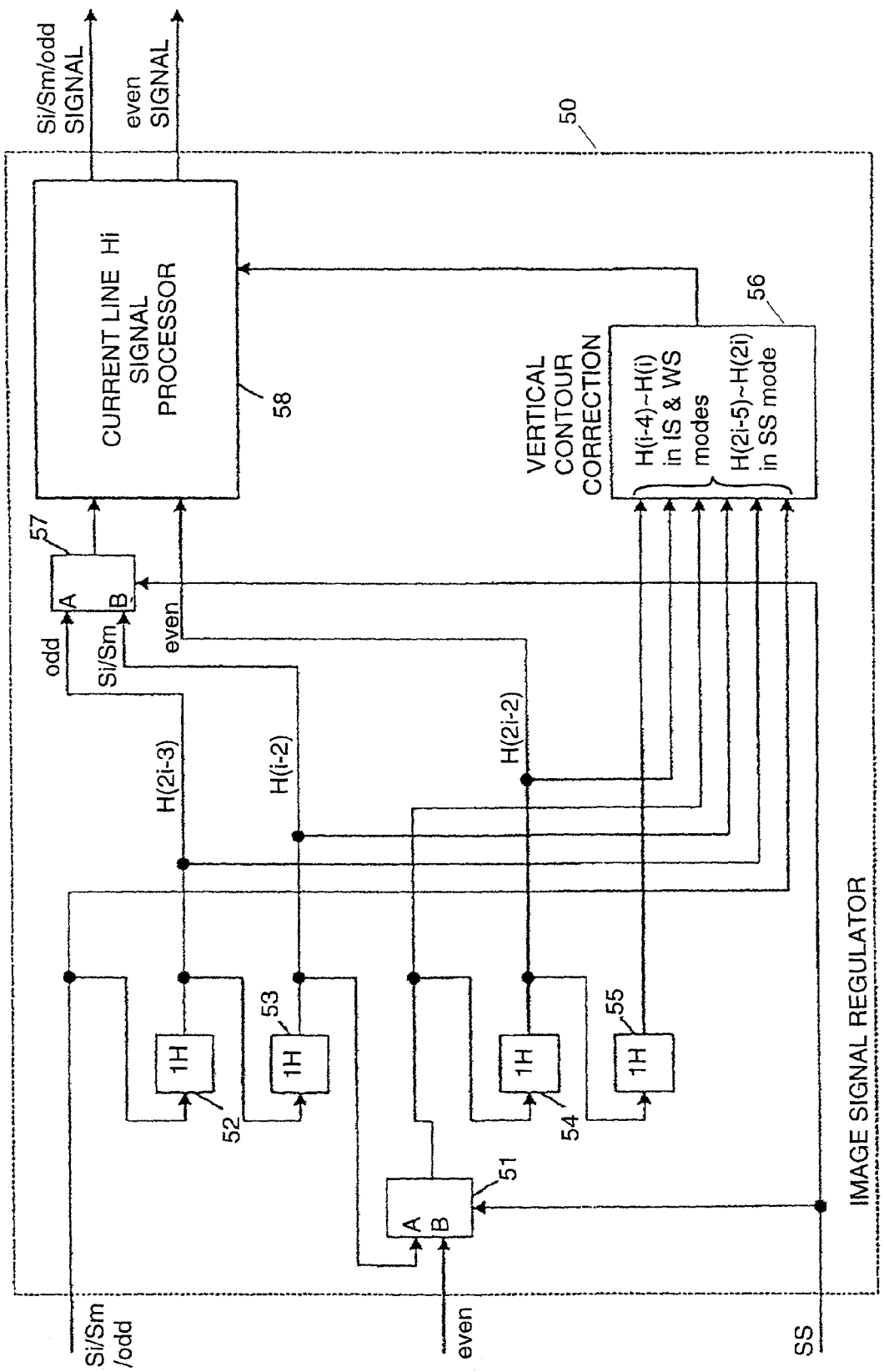
FIG. 4 is a block diagram showing an exemplary structure of an image signal regulator 50 of FIG. 1.

FIG. 4 is a block diagram showing an exemplary structure of an image signal regulator 50 of FIG. 1. In FIG. 4, the image signal regulator 50 comprises a first 1H-memory 52 having its input connected to the Si/Sm/odd input terminal thereof; a second 1H-memory 53 having its input connected to the 1H-memory 52 output; a selector 51 having its input A connected to the 1H-memory 53 output; a third 1H-memory 54 having its input connected to the selector 51 common terminal; a fourth 1H-memory 55 having its input connected to the 1H-memory 54; a vertical contour correction portion 56 having its 6 inputs connected to all the input and output ports of the first through fourth 1H-memories 52 through 55; an alternative selector 57; and a current line signal processor 58. The A input of the selector serves as a current odd line input terminal and is connected with the node among 1H-memories 52 and 53 and the linked input of the element 56. The B input of selector 57 serves as a current line input terminal for Si or Sm image signal and is connected with the node among the 1H-memory 53 output, selector 51 input A and the linked input of element 56. The control input terminals of selectors 51 and 57 are connected to the SS control output terminal of the imager controller 80. The selector 57 common terminal is connected to a first input terminal of the current line signal processor 58. The second input terminal of the processor 58 is connected with the node among the 1H-memories 54 and 55 and the linked input terminal of element 56. The element 56 output is supplied to the current line signal processor 58. The output terminals of the processor 58 serves as the output terminals of the image signal regulator 50.

In the IS and WS modes, assuming the current horizontal line to be expressed as H(i−2), lines H(i−4) through H(i) of image data are supplied to the input terminals of the vertical contour correction portion 56. In other words, the vertical contour correction value for the current line H(i−2) is calculated from 5 lines H(i−4) to H(i).

In the SS mode, assuming the current odd and even horizontal lines to be expressed as H(2i−3) and H(2i−2), respectively, lines H(2i−5) through H(2i) of image data are supplied to the input terminals of the vertical contour correction portion 56. In other words, the vertical contour correction values for the current odd H(2i−3) and even H(2i−2) lines are calculated from 6 lines H(2i−5) to H(2i).

Figure 5:
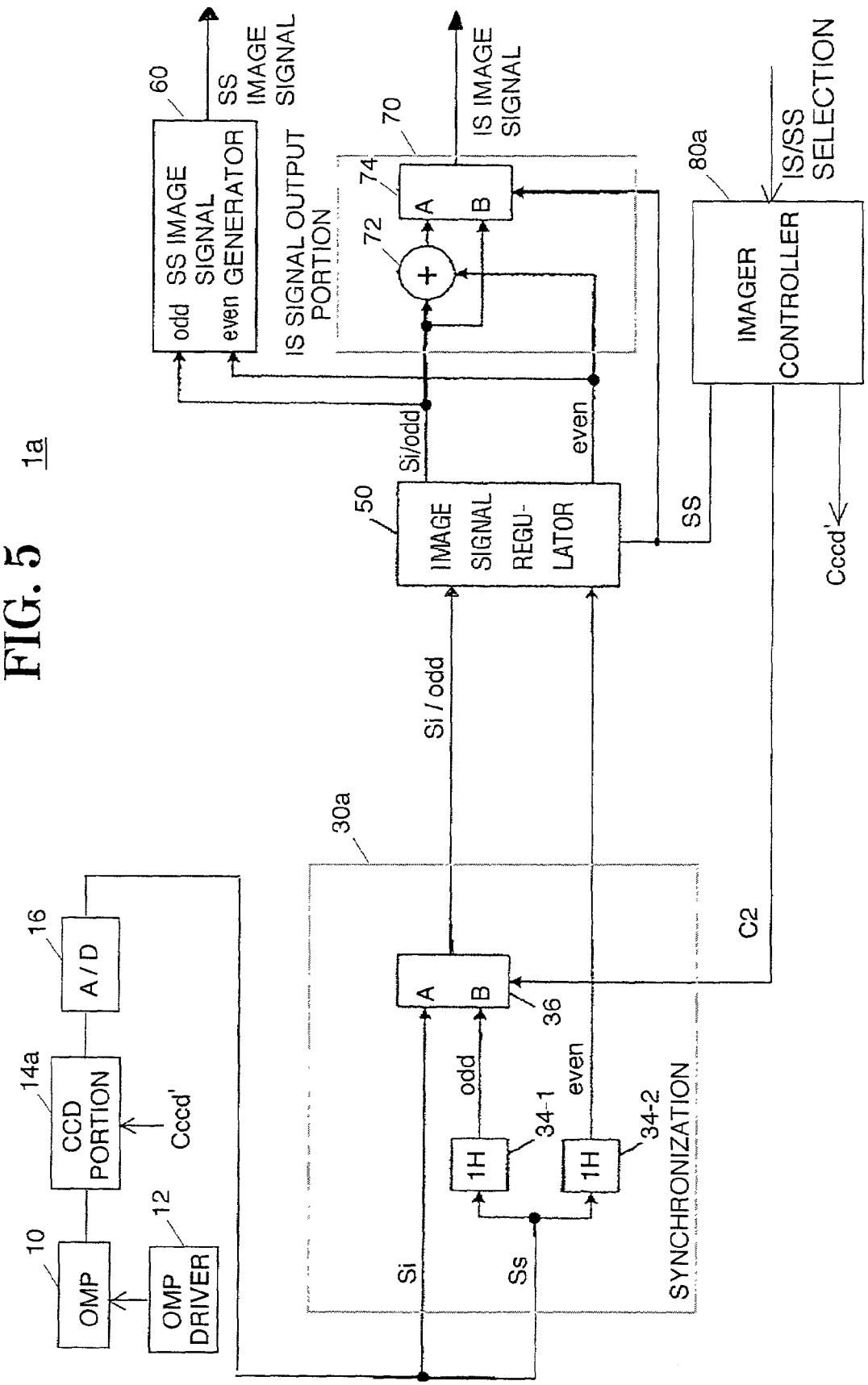
FIG. 5 is a block diagram showing an exemplary arrangement of an imager that effectively supports IS and SS operations in accordance with a modification of the embodiment of FIG. 1.

The arrangement of the inventive image signal regulator 50 enables a highly accurate vertical contour correction with a limited scale of circuit Modifications FIG. 5 is a block diagram showing an exemplary arrangement of an imager 1*a* that effectively supports IS and SS operations in accordance with a modification of the embodiment of FIG. 1. In FIG. 5, the imager 1*a* is identical to that of FIG. 1 except that the CCD portion, the synchronizer and the imager controller have been changed from 14, 30 and 80 to 14*a*, 30*a* and 80*a*, respectively; and the mixer 40 has been eliminated. The CCD portion 14*a* has only the IS and SS modes. The selector 32 has been eliminated and the A/D 16 output is directly supplied to the 1H-memories 34.

In the IS mode, a regulated IS signal Si is output from the selector 74 output. In the SS mode, the SS image signal generator 60 outputs a regulated SS image signal while the selector 74 outputs the regulated IS image signal.

Figure 6:
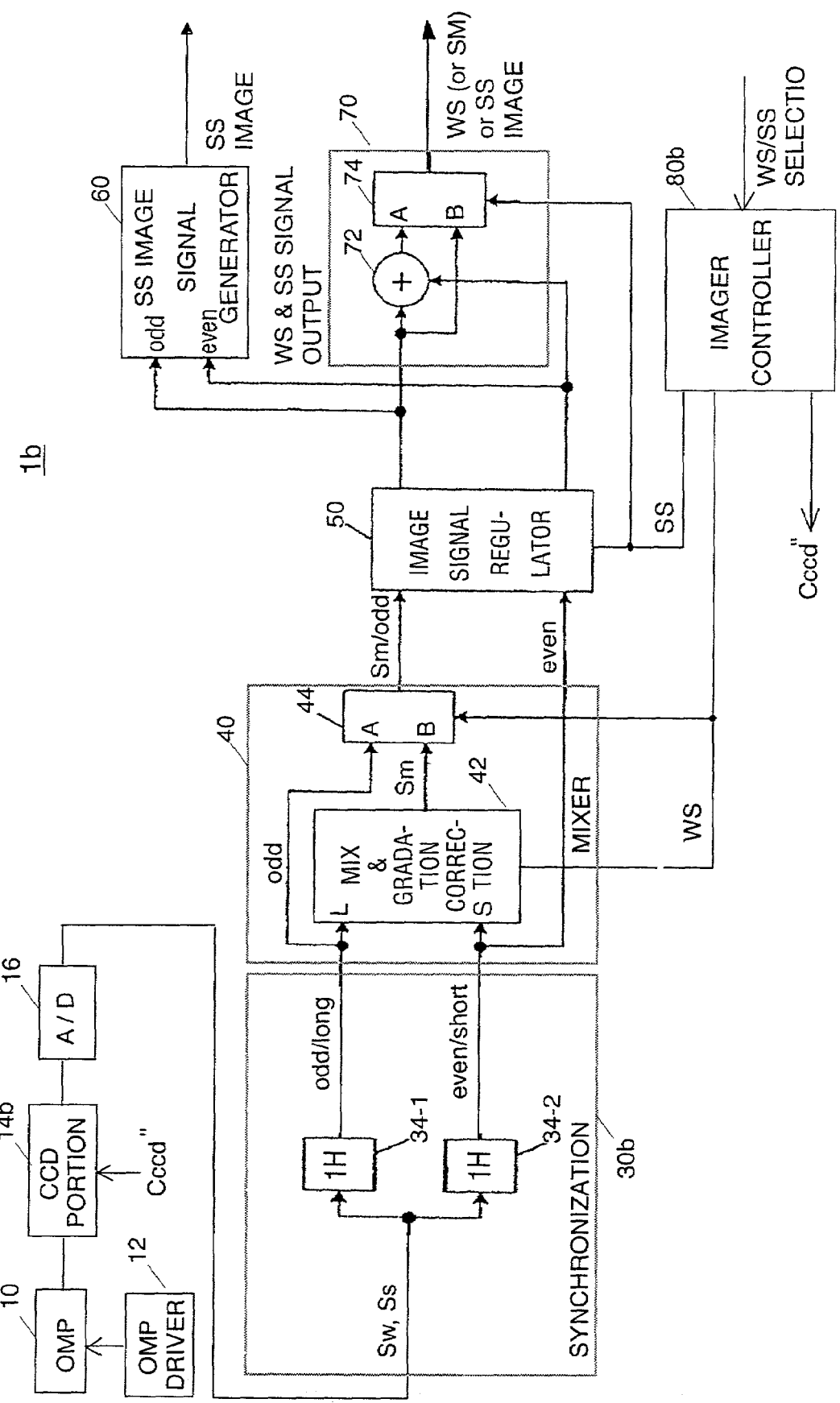
FIG. 6 is a block diagram showing an exemplary arrangement of an imager that effectively supports WS (dynamic range widening scan) and SS operations in accordance with another modification of the embodiment of FIG. 1.

FIG. 6 is a block diagram showing an exemplary arrangement of an imager 1*b* that effectively supports WS (dynamic range widening scan) and SS operations in accordance with another modification of the embodiment of FIG. 1. In FIG. 6, the imager 1*b* is identical to that of FIG. 1 except that the CCD portion and the synchronizer and the imager controller have been changed from 14, 30 and 80 to 14*b*, 30*b* and 80*b*, respectively. The CCD portion 14*b* has only the WS and SS modes. The selectors 32 and 36 have been eliminated and the A/D 16 output is directly supplied to the 1H-memories 34.

In the WS mode, a regulated and dynamic range-widened image signal is output from the selector 74 common terminal. In the SS mode, the SS image signal generator 60 outputs a regulated SS image signal while the selector 74 outputs the regulated IS image signal.

It should be noted that the above-described circuits has been implemented by using discrete components. However, each of the circuit 30 through 80 in FIG. 1, the circuit 30*a*

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of supporting an interlace scan mode, a sequential scan mode and a dynamic range-widening scan mode in a single imager for use in a video camera wherein the imager includes a CCD portion, the method comprising the steps of:

in response to an interlace scan mode selection signal, causing said CCD portion to generate an interlace scan image signal;

in response to a sequential scan mode selection signal, causing said CCD portion to generate a sequential scan image signal, said sequential scan image signal having 2N lines composed of odd lines and even lines, where N is the number of scan lines of an image to be obtained;

synchronizing each pair of odd and even lines of the sequential scan image signal;

doing ordinary image regulations for said synchronized odd and even lines of the sequential scan image signal to provide a first regulated sequential scan image signal of odd lines and a second regulated sequential scan image signal of even lines;

doing the ordinary image regulations for said interlace scan image signal to provide a regulated interlace scan image signal;

in response to said sequential scan mode selection signal, generating a new sequential scan image signal from said first and second regulated sequential scan image signals, which are composed of regulated odd and even line signals in the sequential scan mode;

causing said CCD portion to generate a dynamic range-widening scan image signal of 2N lines in response to a WS mode selection signal, every other line of the dynamic range-widening scan image signal being exposed longer than adjacent lines of said dynamic range-widening scan image signal;

synchronizing each of odd lines of said dynamic range-widening scan image signal with a corresponding even line of said dynamic range-widening scan image signal to provide a first synchronized dynamic range-widening scan image signal of odd lines and a second synchronized dynamic range-widening scan image signal of even lines;

generating a dynamic range-widened image signal from said first and second synchronized dynamic range-widening scan image signals;

doing the ordinary image regulations for said dynamic range-widened image signal to provide a regulated dynamic range-widened image signal;

outputting the regulated interlace scan image signal in said interlace scan mode;

outputting said new sequential scan image signal in said sequential scan mode; and outputting said regulated dynamic range-widening image signal in said dynamic range-widening scan mode.

2. A method as defined in claim 1, wherein said step of doing ordinary image regulations for said synchronized odd and even lines of the sequential scan image signal comprises the steps of:

in said sequential scan mode, calculating a first vertical contour correction value for each pair of current synchronized odd and even lines of said sequential scan image signal by using six lines of data including said pair of current synchronized odd and even lines in the center of the six lines; and performing a vertical contour correction by using said first vertical contour correction value, and said step of doing the ordinary image regulations for said interlace scan image signal comprises the steps of:

in said interlace scan mode, calculating a second vertical contour correction value for each current line of said interlace scan image signal by using five lines of data including said current line in the center of the five lines; and performing a vertical contour correction by using said second vertical contour correction value.

3. A method as defined in claim 1, further comprising the steps of:

in response to said sequential scan mode selection signal, adding said first and second regulated sequential scan image signals together to generate a new interlace scan image signal; and outputting said new interlace scan image signal in said sequential scan mode.

4. A method as defined in claim 1, wherein said step of doing the ordinary image regulations for said dynamic range-widened image signal comprises the steps of:

in said dynamic range-widening scan mode, calculating a third vertical contour correction value for each current line of said dynamic range-widened image signal by using five lines of data including said current line in the center of the five lines; and performing a vertical contour correction by using said third vertical contour correction value.

5. A method of supporting at least a dynamic range-widening scan mode and a sequential scan mode in a single imager for use in a video camera wherein the imager includes a CCD portion, the method comprising the steps of:

in response to a WS mode selection signal, causing said CCD portion to generate a dynamic range-widening scan image signal of 2N lines, N being the number of scan lines of an image to be obtained, and every other line of said dynamic range-widening scan-image signal being exposed longer than adjacent lines of said dynamic range-widening scan image signal;

in response to a sequential scan mode selection signal, causing said CCD portion to generate a sequential scan image signal, said sequential scan image signal having 2N lines composed of odd lines and even lines;

synchronizing each pair of odd and even lines of the sequential scan image signal;

synchronizing each of odd lines of said dynamic range-widening scan image signal with a corresponding even line of said dynamic range-widening scan image signal to provide a first synchronized dynamic range-widening scan image signal of odd lines and a second synchronized dynamic range-widening scan image signal of even lines;

generating a dynamic range-widened image signal from first and second synchronized dynamic range-widening scan image signals in said dynamic range-widening scan mode;

doing ordinary image regulations for said synchronized odd and even lines of the sequential scan image signal to provide a first regulated sequential scan image signal of odd lines and a second regulated sequential scan image signal of even lines;

doing the ordinary image regulations for said dynamic range-widened image signal to provide a regulated dynamic range-widened image signal;

in response to said sequential scan mode selection signal, generating a new sequential scan image signal from said first and second regulated sequential scan image signals, which are composed of regulated odd and even line signals in the sequential scan mode;

outputting the regulated dynamic range-widened image signal in said dynamic range-widening scan mode; and outputting said new sequential scan image signal in said sequential scan mode, wherein said step of doing ordinary image regulations for said synchronized odd and even lines of the sequential scan image signal includes:

in said sequential scan mode, calculating a first vertical contour correction value for each pair of current synchronized odd and even lines of said sequential, scan image signal by using six lines of data including said pair of current synchronized odd and even lines in the center of the six lines; and performing a vertical contour correction by using said first vertical contour correction value, and wherein said step of doing the ordinary image regulations for said dynamic range-widened image signal includes:

in said dynamic range-widening scan mode, calculating a second vertical contour correction value for each current line of said dynamic range-widened image signal by using five lines of data including said current line in the center of the five lines; and performing a vertical contour correction by using said second vertical contour correction value.

6. A method as defined in claim 5, further comprising the steps of:

in response to said sequential scan mode selection signal, adding said first and second regulated sequential scan image signals together to generate a new interlace scan image signal; and outputting said new interlace scan image signal in said sequential scan mode.

7. An imager for use in a video camera, which supports an interlace scan mode, a sequential scan mode and a dynamic range-widening scan mode, the imager comprising:

a CCD portion which generates an interlace scan image signal in response to an interlace scan mode selection signal, generates a sequential scan image signal in response to a sequential scan mode selection signal, and generates a dynamic range-widening scan image signal of 2N lines in response to a WS mode selection signal, said sequential scan image signal having 2N lines composed of odd lines and even lines, every other line of the dynamic range-widening scan image signal being exposed longer than adjacent lines of said dynamic range-widening scan image signal, where N is the number of scan lines of an image to be obtained;

a synchronizer which synchronizes each pair of odd and even lines of the sequential scan image signal to produce a synchronized odd and even lines of the sequential scan image signal, and synchronizes each of odd lines of said dynamic range-widening scan image signal with a corresponding even line of said dynamic range-widening scan image signal to provide a first synchronized dynamic range-widening scan image signal of odd lines and a second synchronized dynamic range-widening scan image signal of even lines;

a first regulator which does ordinary image regulations for said synchronized odd and even lines of the sequential scan image signal to provide a first regulated sequential scan image signal of odd lines and a second regulated sequential scan image signal of even lines, and does the ordinary image regulations for said interlace scan image signal to provide a regulated interlace scan image signal;

a first generator, responsive to said sequential scan mode selection signal, which generates a new sequential scan image signal from said first and second regulated sequential scan image signals, which are composed of regulated odd and even line signals in the sequential scan mode;

a second generator which generates a dynamic range-widening image signal from said first and second synchronized dynamic range-widening scan image signal;

a second regulator which does the ordinary image regulations for said dynamic range-widening image signal to provide a regulated dynamic range-widened image signal;

a first output portion which outputs the regulated interlace scan image signal in said interlace scan mode;

a second output portion which outputs said new sequential scan image signal in said sequential scan model; and a third output portion which outputs said regulated dynamic range-widened image signal in said dynamic range-widening scan mode.

8. An imager as defined in claim 7, wherein said first regulator comprises:

means for, in said sequential scan mode, calculating a first vertical contour correction value for each pair of current synchronized odd and even lines of said sequential scan image signal by using six lines of data including said pair of current synchronized odd and even lines in the center of the six lines;

means for performing a vertical contour correction by using said first vertical contour correction value;

means for, in said interlace scan mode, calculating a second vertical contour correction value for each current line of said interlace scan image signal by using five lines of data including said current line in the center of the five lines; and means for performing a vertical contour correction by using said second vertical contour correction value.

9. An imager as defined in claim 7, wherein said second regulator comprises:

means for, in said dynamic range-widening scan mode, calculating a third vertical contour correction value for each current line of said dynamic range-widened image signal by using five lines of data including said current line in the center of the five lines; and means for performing a vertical contour correction by using said third vertical contour correction value.

10. An imager for use in a video camera, which supports at least an interlace scan mode and a sequential scan mode, the imager comprising:

a CCD portion which generates an interlace scan image signal in response to an interlace scan mode selection signal, and generates a sequential scan image signal in response to a sequential scan mode selection signal, said sequential scan image signal having 2N lines composed of odd lines and even lines, where N is the number of scan limes of an image to be obtained;

a synchronizer which synchronizes each pair of odd and even lines of the sequential scan image signal to produce a synchronized odd and even lines of the sequential scan image signal;

a regulator which does ordinary image regulations for said synchronized odd and even lines of the sequential scan image signal to provide a first regulated sequential scan image signal of odd lines and a second regulated sequential scan image signal of even lines, and does the ordinary image regulations for said interlace scan image signal to provide a regulated interlace scan image signal;

a first generator, responsive to said sequential scan mode selection signal, which generates a new sequential scan image signal from said first and second regulated sequential scan image signals, which are composed of regulated odd and even line signals in the sequential scan mode;

an adder which adds said first and second regulated sequential scan image signals together in response to said sequential scan mode selection signal to generate a new interlace scan image signal;

a first output portion which outputs the regulated interlace scan image signal in said interlace scan mode;

a second output portion which outputs said new sequential scan image signal in said sequential scan mode; and a third output portion which outputs said new interlace scan image signal in said sequential scan mode.

11. An imager for use in a video camera, which supports at least a dynamic range-widening scan mode and a sequential scan mode, the imager comprising:

a CCD portion means which generates a dynamic range-widening scan image signal of 2N lines in response to a WS mode selection signal, and generating a sequential scan image signal in response to a sequential scan mode selection signal, N being the number of scan lines of an image to be obtained, every other line of said dynamic range-widening scan image signal being exposed longer than adjacent lines of said dynamic range-widening scan image signal, said sequential scan image signal having 2N lines composed of odd lines and even lines;

a synchronizer which synchronizes each pair of odd and even lines of the sequential scan image signal, and synchronizing each of odd lines of said dynamic range-widening scan image signal with a corresponding even line of said dynamic range-widening scan image signal to provide a first synchronized dynamic range-widening scan image signal of odd lines and a second synchronized dynamic range-widening scan image signal of even lines;

a first generator which generates a dynamic range-widened image signal from said first and second synchronized dynamic range-widening scan image signals in said dynamic range-widening scan mode;

a regulator which does ordinary image regulations for said odd and even lines of the sequential scan image signal to provide a first regulated sequential scan image signal of odd lines and a second regulated sequential scan image signal of even lines, and does the ordinary image regulations for said dynamic range-widened image signal to provide a regulated dynamic range-widened image signal;

a second generator, responsive to said sequential scan mode selection signal, which generates a new sequential scan image signal from said first and second regulated sequential scan image signals, which are composed of regulated odd and even line signals in the sequential scan mode;

a first output portion which outputs the regulated dynamic range-widened image signal in said dynamic range-widening scan mode; and a second output portion which outputs said new sequential scan image signal in said sequential scan mode, wherein said regulator comprises:

means for, in said sequential scan mode, calculating a first vertical contour correction value for each pair of current synchronized odd and even lines of said sequential scan image signal by using six lines of data including said pair of current synchronized odd and even lines in the center of the six lines;

means for performing a vertical contour correction by using said first vertical contour correction value;

means for, in said dynamic range-widening scan mode, calculating a second vertical contour correction value for each current line of said dynamic range-widened image signal by using five lines of data including said current line in the center of the five lines; and means for performing a vertical contour correction by using said second vertical contour correction value.

12. An imager for use in a video camera, which supports at least a dynamic range-widening scan mode and a sequential scan mode, the imager comprising:

a CCD portion which generates a dynamic range-widening scan image signal of 2N lines in response to a WS mode selection signal, and generating a sequential scan image signal in response to a sequential scan mode selection signal, N being the number of scan lines of an image to be obtained, every other line of said dynamic range-widening scan image signal being exposed longer than adjacent lines of said dynamic range-widening scan image signal, said sequential scan image signal having 2N lines composed of odd lines and even lines;

a synchronizer which synchronizes each pair of odd and even lines of the sequential scan image signal, and synchronizing each of odd lines of said dynamic range-widening scan image signal with a corresponding even line of said dynamic range-widening scan image signal to provide a first synchronized dynamic range-widening scan image signal of odd lines and a second synchronized dynamic range-widening scan image signal of even lines;

a first generator which generates a dynamic range-widened image signal from said first and second synchronized dynamic range-widening scan image signals in said dynamic range-widening scan mode;

a regulator which does ordinary image regulations for said odd and even lines of the sequential scan image signal to provide a first regulated sequential scan image signal of odd lines and a second regulated sequential scan image signal of even lines, and does the ordinary image regulation for said dynamic range-widened image signal to provide a regulated dynamic range-widened image signal;

a second generator, responsive to said sequential scan mode selection signal, which generates a new sequential scan image signal from said first and second regulated sequential scan image signals, which are composed of regulated odd and even line signals in the sequential scan mode;

an adder which adds said first and second regulated sequential scan image signals together in response to said sequential scan mode selection signal to generate a new interlace scan image signal;

a first output portion which outputs the regulated dynamic range-widened image signal in said dynamic range-widening scan mode;

a second output portion which outputs said new sequential scan image signal in said sequential scan mode; and a third output portion which outputs said new interlace scan image signal in said sequential scan mode.

13. An integrated circuit, for use in a video camera, which processes an image signal supplied from a CCD portion of the camera in any one of an interlace scan mode, a sequential scan mode and a dynamic range-widening scan mode, wherein the CCD portion is capable of generating interlace scan image signal based on the interlace scan mode, a sequential scan image signal based on the sequential scan mode and a dynamic range-widening scan image signal of 2N lines based on the dynamic range-widening scan mode, the sequential scan image signal having 2N lines composed of odd lines and even lines, every other line of the dynamic range-widening scan image signal being exposed longer than adjacent lines of said dynamic range-widening scan image signal, where N is the number of scan lines of an image to be obtained, the integrated circuit comprising:

a first synchronizer which synchronizes each pair of odd and even lines of the sequential scan image signal generated by the CCD portion to produce a synchronized odd and even lines of the sequential scan image signal;

a first regulator which does ordinary image regulations for said synchronized odd and even lines of the sequential scan image signal to provide a first regulated sequential scan image signal of odd lines and a second regulated sequential scan image signal of even lines, and does the ordinary image regulations for said interlace scan image signal generated by the CCD portion to provide a regulated interlace scan image signal;

a first generator, responsive to said sequential scan mode selection signal, which generates a new sequential scan image signal from said first and second regulated sequential scan image signals, which are composed of regulated odd and even line signals in the sequential scan, mode;

a second synchronizer which synchronizes each of odd lines of said dynamic range-widening scan image signal with a corresponding even line of said dynamic range-widening scan image signal to provide a first synchronized dynamic range-widening scan image signal of odd lines and a second synchronized dynamic range-widening scan image signal of even lines;

a second generator which generates a dynamic range-widened image signal from said first and second synchronized dynamic range-widening scan image signals;

a second regulator which does the ordinary image regulations for said dynamic range-widened image signal to provide a regulated dynamic range-widened image signal;

a first output portion which outputs the regulated interlace scan image signal output portion which outputs the regulated interlace scan mode;

a second output portion which outputs said new sequential scan image signal in said sequential scan mode; and a third output portion which outputs said regulated dynamic range-widened image signal in said dynamic range-widening scan mode.

14. An integrated circuit as defined in claim 13, wherein said first regulator comprises:

means for, in said sequential scan mode, calculating a first vertical contour correction value for each pair of current synchronized odd and even lines of said sequential scan image signal by using six lines of data including said pair of current synchronized odd and even lines in the center of the six lines;

means for performing a vertical contour correction by using said first vertical contour correction value;

means for, in said interlace scan mode, calculating a second vertical contour correction value for each current line of said interlace scan image signal by using five lines of data including said current line in the center of the five lines; and means for performing a vertical contour correction by using said second vertical contour correction value.

15. An integrated circuit as defined in claim 13, further comprising:

an adder which adds said first and second regulated sequential scan image signals together in response to said sequential scan, mode selection signal to generate a new interlace scan image signal, and outputs said new interlace scan image signal in said sequential scan mode.

16. An integrated circuit as defined in claim 13, wherein said second regulator comprises:

means for, in said dynamic range-widening scan mode, calculating a third vertical contour correction value for each current line of said dynamic range-widened image signal by using five lines of data including said current line in the center of the five lines; and means for performing a vertical contour correction by using said third vertical contour correction value.

17. An integrated circuit, for use in a video camera, which processes an image signal supplied from a CCD portion of the camera in any one of at least a dynamic range-widening scan mode and a sequential scan mode, wherein the CCD portion is capable of generating at least a dynamic range-widening scan image signal of 2N lines based on the dynamic range-widening scan mode and a sequential scan image signal of 2N lines based on the sequential scan mode, N being the number of scan lines of an image to be obtained, every other line of said dynamic range-widening scan image signal being exposed longer than adjacent lines of said dynamic range-widening scan image signal, the integrated circuit comprising:

a synchronizer which synchronizes each pair of odd and even lines of the sequential scan image signal generated by the CCD portion, and synchronizing each of odd lines of said dynamic range-widening scan image signal generated by the CCD portion with a corresponding even line of said dynamic range-widening scan image signal to provide a first synchronized dynamic range-widening scan image signal of odd lines and a second synchronized dynamic range-widening scan image signal of even lines;

a first a generator which generates a dynamic range-widened image signal from said first and second synchronized dynamic range-widening scan image signals in said dynamic range-widening scan mode;

a regulator which does ordinary image regulations for said synchronized odd and even lines of the sequential scan image signal to provide a first regulated sequential scan image signal of odd lines and a second regulated sequential scan image signal of even lines, and does the ordinary image regulations for said dynamic range-widened image signal to provide a regulated dynamic range-widened image signal;

a second generator, responsive to said sequential scan mode selection signal, which generates a new sequential scan image signal from said first and second regulated sequential scan image signals, which are composed of regulated odd and even line signals in the sequential scan mode;

a first output portion which outputs the regulated dynamic range-widened image signal in said dynamic range-widening scant mode; and a second output portion which outputs said new sequential scan image signal in said sequential scan mode, wherein said regulator comprises:

means for, in said sequential scan mode, calculating a first vertical contour correction value for each pair of current, synchronized odd and even lines of said sequential scan image signal by using six lines of data including said pair of current synchronized odd and even lines in the center of the six lines;

means for performing a vertical contour correction by using said first vertical contour correction value;

means for, in said dynamic range-widening scan mode, calculating a second vertical contour correction value for each current line of said dynamic range-widened image signal by using five lines of data including said current line in the center of the five lines; and means for performing a vertical contour correct ion by using said second vertical contour correction value.

18. An integrated circuit as defined in claim 17, further comprising:

an adder which adds said first and second regulated sequential scan image signals together in response to said sequential scan mode selection signal to generate a new interlace scan image signal, and outputs said new interlace scan image signal in said sequential scan mode.

* * * * *